(No Model.)

C. A. PFENNING.
FASTENER FOR GLOVES.

No. 603,202.      Patented Apr. 26, 1898.

2 Sheets—Sheet 1.

Witnesses:

Inventor:
Carl August Pfenning (No Model.) 2 Sheets—Sheet 2.

C. A. PFENNING.
FASTENER FOR GLOVES.

No. 603,202. Patented Apr. 26, 1898.

Witnesses:

Inventor:
Carl August Pfenning

UNITED STATES PATENT OFFICE.

CARL AUGUST PFENNING, OF BARMEN, GERMANY.

FASTENER FOR GLOVES.

SPECIFICATION forming part of Letters Patent No. 603,202, dated April 26, 1898.

Application filed April 29, 1897. Serial No. 634,460. (No model.)

*To all whom it may concern:*

Be it known that I, CARL AUGUST PFENNING, a subject of the King of Prussia, Emperor of Germany, residing at Barmen-Rittershausen, in the Province of Rhenish Prussia, Kingdom of Prussia, Germany, have invented new and useful Improvements in Fasteners for Gloves, of which the following is a specification.

The fastening of the locking parts of a snap or pressure button forming the subject of this invention is especially designed for use in gloves, and it brings each of the lock-plates to a level with the cloth-surface, so that the flaps united by the fastening lie close on top of one another, giving a neat appearance to the fastened glove and not allowing any tilting or tipping of the fastening in consequence of the resulting strain in the fabric or leather. Furthermore is sought the avoidance of an increased perforation of the fabric or material, whereby the entire hold of the fastening parts is materially weakened, and finally the possibility of providing the upper part of the button or fastening with inset genuine or artificial jewels, pictures, or the like, or to allow the fabric or material of the glove to appear in the same, so as to give the impression that the upper part or button is made by means of the same fabric or material. To attain the said objects, the fabric or material at each fastener part is pressed down over an inclined edge of the fastener-plate through a ring, also inclined, into the plane of said plate, and the connection with the fabric or material is effected by the prongs piercing the same grasping outwardly or inwardly into or to the rear of a ridge, and while they remain fully covered in the same are bent over, and thus effect a firm secure connection of the parts.

In the annexed drawings the manner of attachment is represented in several forms of application and on materially-enlarged scale.

Figure 1:
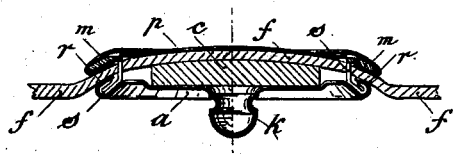
Figure 5:
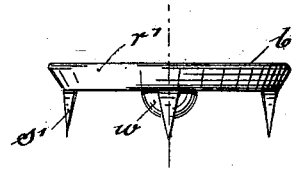
Figure 2:
Figure 6:
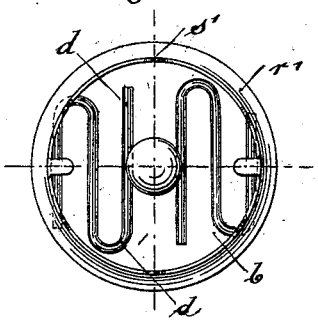
Figure 3:
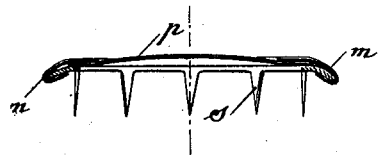
Figure 4:
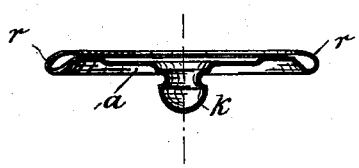
Figure 7:
Figure 12:
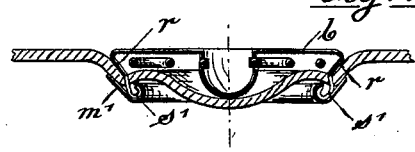
Figure 8:
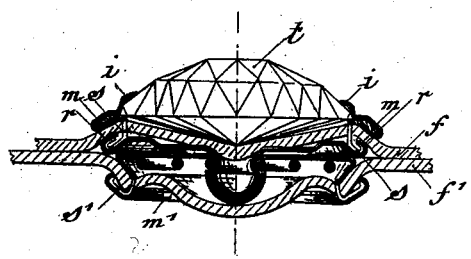
Figure 9:
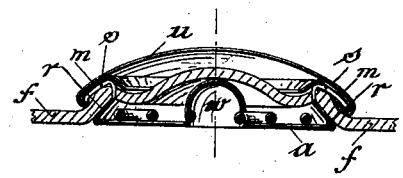
Figure 10:
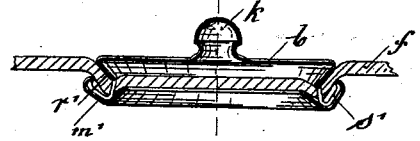
Figure 14:
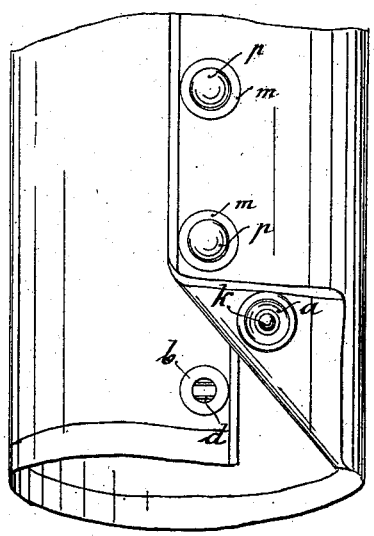
Figure 11:
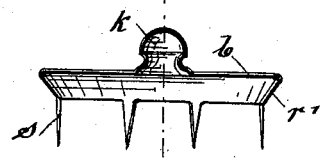
Figure 13:
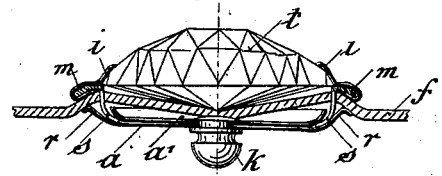

Figure 1 shows a cross-section of the upper part of the fastening with the fabric or material extending into the interior of the fastening-ring. Fig. 2 is a cross-section of the corresponding lower part of the fastening. Fig. 3 is a detail sectional view of the ring of the upper part of the fastening provided with attaching-prongs. Fig. 4 is a cross-section of the plate pertaining thereto. Fig. 5 is a side elevation of the plate of the lower part of the fastening. Fig. 6 is an inner view of said plate. Fig. 7 is a cross-section of the ring pertaining to the lower or under part of the fastening. Fig. 8 is a cross-section of a fastening closed and with a stone set in the upper part. Figs. 9 and 10 show in cross-section upper and lower fastening parts, the upper part being closed with a metallic cap. Fig. 11 is a cross-section of the corresponding prong-plate of the lower part of the fastening. Figs. 12 and 13 show in cross-section an under and upper part of a fastening in which the attachment is effected by the prongs extending or grasping inwardly. Fig. 14 shows, on a smaller scale, the pressure-button fastening of Figs. 1 and 2 applied to a glove part.

In the form shown in Fig. 1 the lower section of the upper part of the fastening has the edge $r$ bent into an inclined hollow ridge. This fastener-section is located at one side of the fabric. At the opposite side of the fabric is a ring $m$, provided with prongs $s$. This ring $m$ has its outer edge inclined to correspond to the inclined edge $r$. Toward its center or interior the ring $m$ is practically flat. On pressing the ring $m$ into place the prongs $s$, piercing the fabric, strike on the inner incline of the plate $a$, carrying the fastening-head $k$, and are by the pressure bent over behind the edge $r$, whereby a firm connection of ring $m$ and plate $a$ is effected. The fabric or goods $f$, which is pressed down over the inclined ridge or edge $r$ by the correspondingly-inclined outer edge of the ring $m$ and is thus brought into the plane of the plate $a$, is given an upward bulge inside the latter by an inlay $c$, of pasteboard or other suitable material, so that its surface enters into the ring $m$ and fills the same. For protection and better appearance the fabric is practically covered by a transparent celluloid plate $p$, laid into the ring. Beneath this also can be laid a picture or other decoration to give the upper part of the fastening the character or appearance of a button.

In the lower part of the fastening, Fig. 2, the prongs $s'$ are applied at the upwardly-inclined edge $r'$, and the ring $m'$, channeled in cross-section, has at the outer edge a short inward bend or crimp $m^2$. On being applied to the fabric the prongs $s'$, gliding outward on the inner inclined surface of the ring $m'$, are bent back until with their ends or points they engage back of the bent-over edge $m^2$ of the ring $m'$, whereby the firm connection of the under part of the fastening with the fabric is effected.

As the manner of attachment leaves the space inside the ring or bezel $m$ of the upper part of the fastening free of all attaching means, said ring, as seen in Figs. 8 and 13, can serve for the reception of a gem $t$, sufficient space existing above the fastening-head $k$ to receive the lower projection of the stone required for effecting the reflection of light. As, moreover, for uniting the parts $m$ and $a$ merely a pressure about the edge $m$ is required for the purpose of forcing the prongs $s$ into the inclined ridge $r$, the set-stone is not touched by said pressure. The same holds true of the underlaid celluloid plate $p$ and pictures or the like which may be arranged thereunder.

The fastening-head $k$, which is held in the recess $w$ by springs $d$ or in other manner, can also be arranged at the lower part of the fastening, as in the arrangement of Figs. 10 and 11, and the recess $w$ for the reception of head $k$ can be arranged in the upper part of the fastening. In order to then cover the fabric inside the ring $m$ of the upper part and to give this part the form of a button, a cap $u$ is placed over the ring.

What I claim as new, and desire to secure by Letters Patent, is—

A fastening device having two contacting parts, each part formed of two sections adapted to receive fabric between them, one of the sections having prongs adapted to pierce the fabric and to be bent by contact with the opposite section, the sections of the upper fastening part having their edges or circumferences inclined downwardly or toward the lower fastening part, and the sections of the lower fastening part having their edges or circumferences inclined upward or toward the upper fastening part to cause the flaps or cloth secured by the fastening to lie close upon or in contact with one another.

In testimony whereof I have hereunto set my hand in the presence of two subscribing witnesses.

CARL AUGUST PFENNING.

Witnesses:
OTTO KÖNIG,
R. E. JAHN.